United States Patent [19]

Kitahara et al.

[11] Patent Number: 5,455,925
[45] Date of Patent: Oct. 3, 1995

[54] DATA PROCESSING DEVICE FOR MAINTAINING COHERENCY OF DATA STORED IN MAIN MEMORY, EXTERNAL CACHE MEMORY AND INTERNAL CACHE MEMORY

[75] Inventors: Takeshi Kitahara, Kawasaki; Masato Mitsuhashi, Hiratsuka; Atsushi Fujihira, Kawasaki, all of Japan

[73] Assignee: Fujitsu Limited, Kawasaki, Japan

[21] Appl. No.: 111,731

[22] Filed: Aug. 23, 1993

Related U.S. Application Data

[63] Continuation of Ser. No. 584,692, Sep. 19, 1990, abandoned.

[30] Foreign Application Priority Data

Sep. 19, 1989 [JP] Japan ................................. 1-240723

[51] Int. Cl.$^6$ .......................... G06F 12/06; G06F 13/00
[52] U.S. Cl. ........................... 395/449; 364/DIG. 1; 364/243.45; 364/246.1; 364/254.3; 395/473
[58] Field of Search ............. 395/425; 364/200 MS File, 364/900 MS File, 243.45, 246.1, 254.3

[56] References Cited

U.S. PATENT DOCUMENTS

| | | | |
|---|---|---|---|
| 4,802,085 | 1/1989 | Levy et al. | 364/200 |
| 4,858,111 | 8/1989 | Steps | 364/200 |
| 4,875,160 | 10/1989 | Brown, III | 364/200 |
| 4,912,630 | 3/1990 | Cochcroft et al. | 395/425 |
| 4,933,835 | 6/1990 | Sachs et al. | 395/425 |
| 5,014,188 | 5/1991 | Kawamura | 395/425 |
| 5,023,828 | 6/1991 | Grundmann et al. | 395/375 |
| 5,025,365 | 6/1991 | Mathur et al. | 364/200 |
| 5,025,366 | 6/1991 | Baror | 364/200 |
| 5,058,006 | 10/1991 | Durdan et al. | 395/325 |
| 5,072,369 | 12/1991 | Theus et al. | 395/425 |

OTHER PUBLICATIONS

Electronic Engineering, vol. 59, No. 730, Oct. 1987, pp. 57–63; D. Schanin: "Cache Coherency In Microprocessor Based Systems", Figs. 7, 8; p. 60, left–hand col., line 15—p. 63, right–hand col., line 24.
Computer Society International Conference (Compcon) Conference No. 33, spring 1988, pp. 218–222, IEEE, New York, US; L. Quinones: "The NS32605 Cache Controller", Fig. 1; p. 220, lines 7–49.

Primary Examiner—Allen R. MacDonald
Assistant Examiner—Frank J. Asta
Attorney, Agent, or Firm—Staas & Halsey

[57] ABSTRACT

A fetching operation break unit breaks a fetching operation of a block data from a main memory, when a system bus is released during the fetching of the block data and also when data written due to a write access by an external device into the main memory coincides with the fetching of one block data. Further, a notification means notifies the state of the fetching operation to an external cache memory. Therefore, the external cache memory can confirm whether a block-in operation of the microprocessor is broken or not, and the contents of the external cache can correctly coincide with the contents of the internal cache and the main memory by carrying out a steal operation, so that the operational reliability of a computer system can be increased.

30 Claims, 9 Drawing Sheets

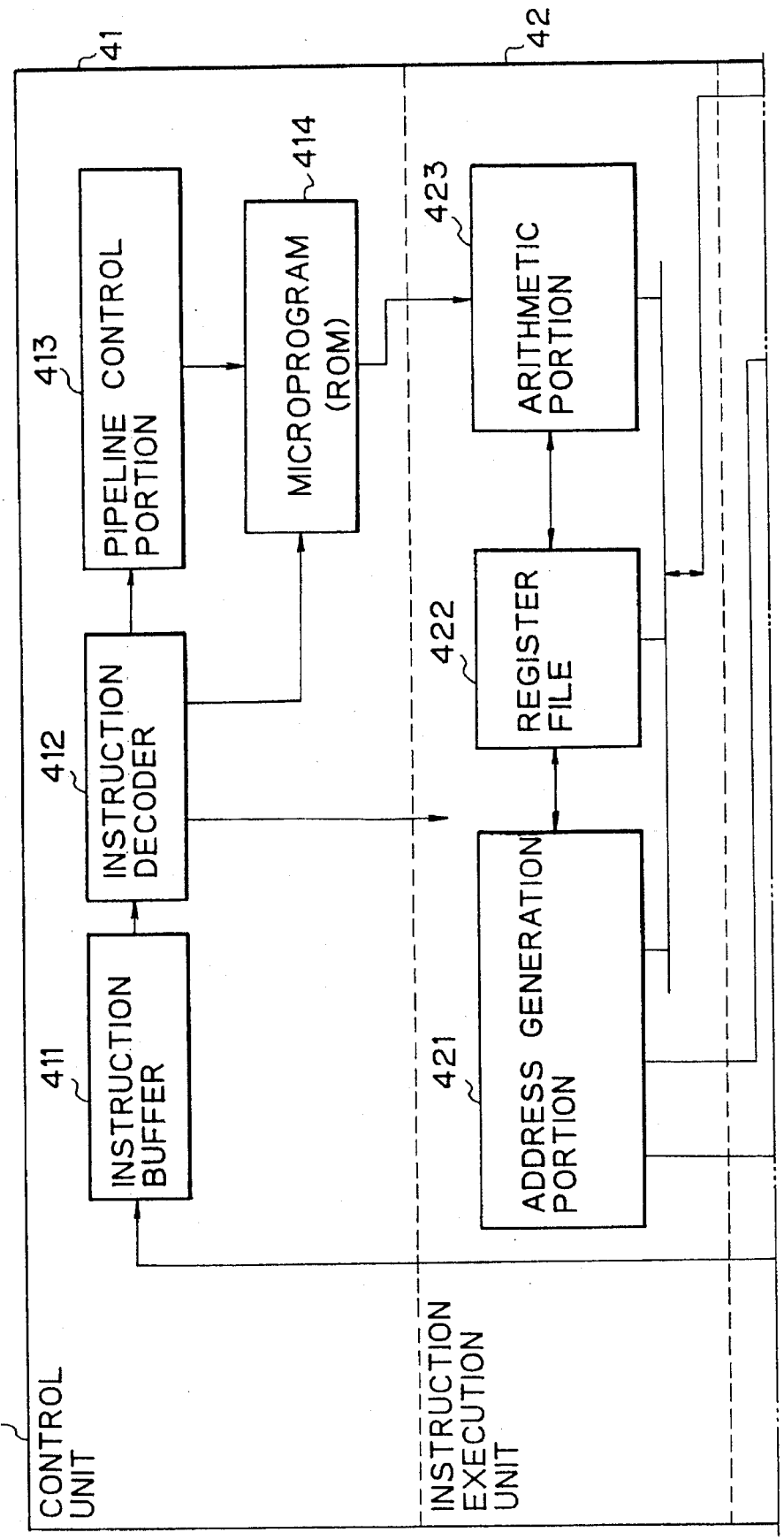

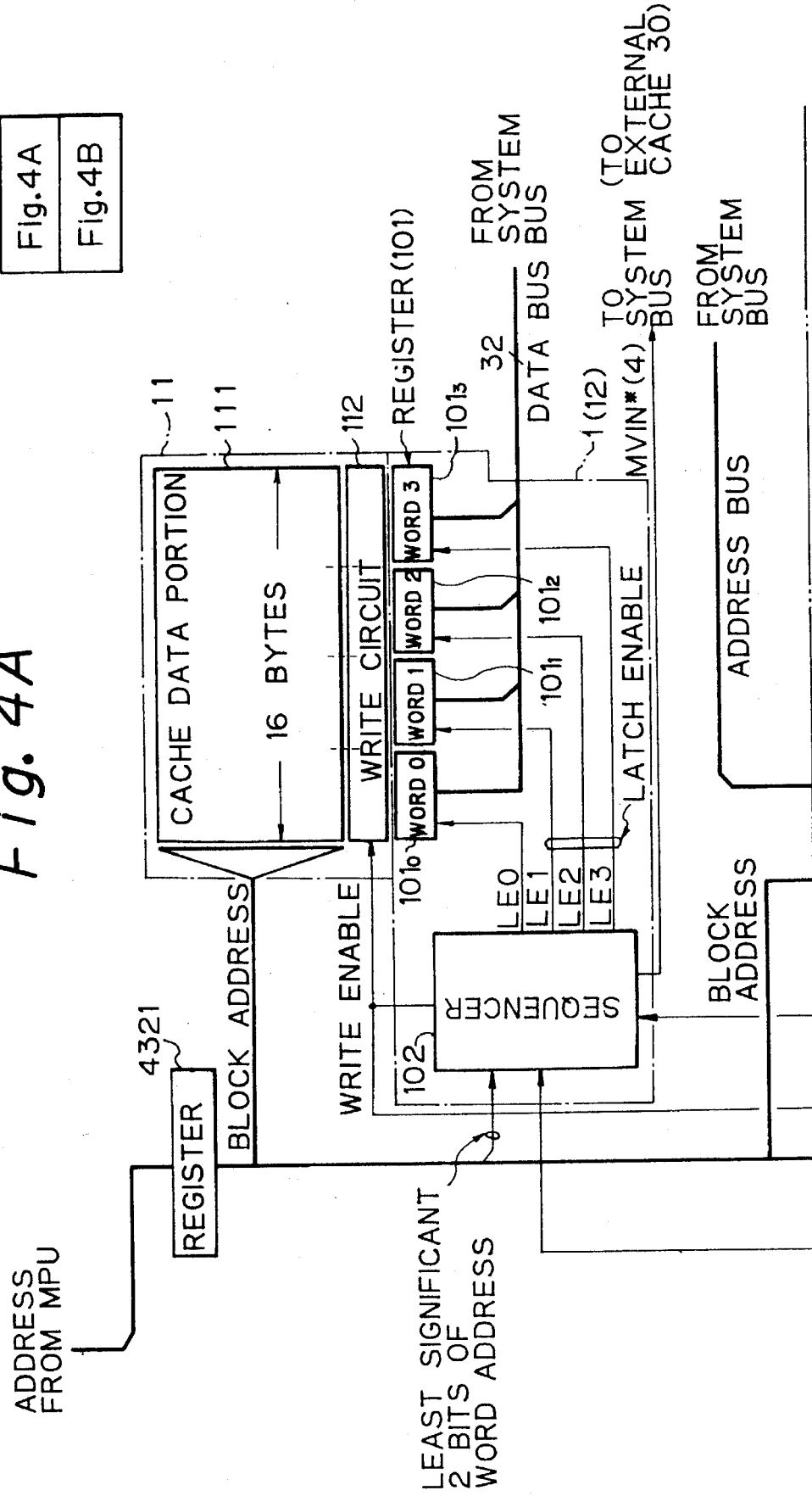

DATA PROCESSING DEVICE FOR MAINTAINING COHERENCY OF DATA STORED IN MAIN MEMORY, EXTERNAL CACHE MEMORY AND INTERNAL CACHE MEMORY

This application is a continuation of application Ser. No. 07/584,692, filed Sep. 19, 1990, now abandoned.

BACKGROUND OF THE INVENTION

1. Field of the Invention

The present invention relates to a data processing device, more particularly, to a microprocessor including an internal cache memory for storing a part of the contents of a main memory. The microprocessor is applied to a computer system having a mass storage external cache memory and an external device such as a direct memory access controller, and is used to control the external cache memory.

2. Description of the Related Art

Recently, in a data processing system (computer system) having an internal cache memory (which may be simply called an internal cache) provided in a microprocessor (microprocessor unit: MPU), an external cache memory (which may be simply called an external cache), an external device such as a direct memory access controller, and a main memory, a block transfer process for transferring data is carried out. In this data processing system, when data for an operand access or an instruction fetch for executing an instruction is not stored in the internal cache, that is, when the data for the instruction fetch or the operand access do not exist (which may be called a "miss-hit"), the microprocessor fetches block unit data (block data) from an external main memory and inputs the block data into the internal cache (which may be called a block-in operation). Therefore, a part of the internal cache memory is changed, and a cache control for coinciding the contents of the external cache with the contents of the internal cache should be carried out.

In one aspect of a previously known cache control system, when a block transfer operation is carried out by a microprocessor through a system bus, block data transferred through the system bus is fetched by the external cache such that the external cache steals the block data on the system bus, so that the contents of the internal cache and the external cache coincide with each other. In another aspect of a previously known cache control system, when a block-in operation is carried out through a system bus and a part of a main memory is rewritten by an external device through the system bus, and also when data corresponding to the rewritten part of the main memory coincides with the block data of being fetched by the block-in operation, a microprocessor controls the cache control system to break the block-in operation thereof.

Nevertheless, when the external cache carries out a steal operation, the block-in operation is broken by the microprocessor and another block-in operation following the broken block-in operation is started, as a result of which the external cache cannot discriminate whether the block-in operation is a new block-in operation or not, and thus an error in operation may be caused in the external cache.

SUMMARY OF THE INVENTION

It is an object of the present invention to provide a data processing device for maintaining coherency of data stored in a main memory, an external cache memory and an internal cache memory, and also to provide a data processing device having high operational reliability for a data processing system.

According to the present invention, there is provided a data processing device, connected to a main memory, an external cache memory and an external device through a system bus, and including an internal cache memory for storing a part of the contents of the main memory, wherein the data processing device comprises a block-in unit for fetching one block data from the main memory, when data for an operand access or an instruction fetch for executing an instruction is not stored in the internal cache memory; a bus release unit, for releasing the system bus in accordance with a bus request signal output from the external device; a block-in break unit for breaking the fetching operation of the block-in unit, when the system bus is released during the fetching of the one block data and also when data written due to a write access by the external device into the main memory coincides with the fetching of one block data and a notification unit for notifying the state of the fetching operation as to whether it is being continuously carried out or not, to the external cache memory.

The external cache memory may steal the data transferred to the internal cache memory through the system bus. The external cache memory may stop the subsequent steal operations in accordance with a notification signal output from the notification unit. The external device may be a direct memory access controller. The data may be written into the internal cache memory by using a block transfer process.

The block-in unit may comprise a register and a sequencer. The register may be divided into four word blocks. The sequencer may include counters, a decoder, flip-flops, and logic gates. The block-in break unit may comprise a comparator and logic gates. The internal cache memory may comprise a cache data portion, a write circuit for the cache data portion, a block address portion, and a write circuit for the block address portion. The block-in unit and the internal cache memory may be provided in a memory management unit. The bus release unit, the block-in break unit and the notification unit may be provided in an address monitor control and block access portion of a bus control unit.

According to the present invention, there is also provided a monolithic microprocessor formed in a single semiconductor body, connected to a main memory, an external cache memory and an external device through a system bus, wherein the monolithic microprocessor comprises an instruction control unit for controlling fetching, decoding, and executing of instructions; an instruction execution unit for calculating an operand address and executing an operand operation; a memory management unit including an internal cache memory for storing a part of the contents of the main memory, and a block-in unit for fetching one block data from the main memory, when data for an operand access or an instruction fetch for executing an instruction is not stored in the internal cache memory; and a bus control unit for transferring data among an external I/O, the external device, the external cache memory, the main memory and the monolithic microprocessor through the system bus. Further, the bus control unit, comprises a bus release unit for releasing the system bus in accordance with a bus request signal output from the external device; a block-in break unit, for breaking the fetching operation of the block-in unit, when the system bus is released during the fetching of the one block data and also when data written due to a write access by the external device into the main memory coincides with the fetching of one block data; and a notification unit for notifying the state of the fetching operation, as to whether it is being continuously carried out or not, to the external cache memory.

Furthermore, according to the present invention, there is provided a data processing system comprising a main memory; an external cache memory; an external device; a system bus; and a microprocessing unit including an internal cache memory for storing a part of the contents of the main memory, which is connected to the main memory, the external cache memory and the external device through the system bus. Further the microprocessing unit comprises a block-in unit for fetching one block data from the main memory when data for an operand access or an instruction fetch for executing an instruction is not stored in the internal cache memory; a bus release unit for releasing the system bus in accordance with a bus request signal output from the external device; a block-in break unit for breaking the fetching operation of the block-in unit, when the system bus is released during the fetching of the one block data and also when data written due to a write access by the external device into the main memory coincides with the fetching of one block data; and a notification unit for notifying the state of the fetching operation, as to whether it is being continuously carried out or not, to the external cache memory.

Additionally, according to the present invention, there is also provided a cache control method of avoiding inconsistency among an internal cache memory provided in a microprocessor unit, an external cache memory and a main memory connected to the internal cache memory through a system bus, wherein the cache control method comprises a step of fetching one block data from the main memory when data for an operand access or an instruction fetch for executing an instruction is not stored in the internal cache memory; a step of releasing the system bus in accordance with a bus request signal output from the external device; a step of breaking the fetching operation of the data, when the system bus is released during the fetching of the one block data and also when data written due to a write access by the external device into the main memory coincides with the fetching of one block data; a step of notifying the state of the fetching operation, as to whether it is being continuously carried out or not, to the external cache memory; and a step of stopping a steal operation of the external cache for fetching the data transferred from the main memory to the internal cache through the system bus.

BRIEF DESCRIPTION OF THE DRAWINGS

The present invention will be more clearly understood from the description of the preferred embodiments as set forth below with reference to the accompanying drawings, wherein.

DESCRIPTION OF THE PREFERRED EMBODIMENTS

Below, the preferred embodiments of a data processing device according to the present invention will be explained, with reference to the accompanying drawings.

Figure 1:
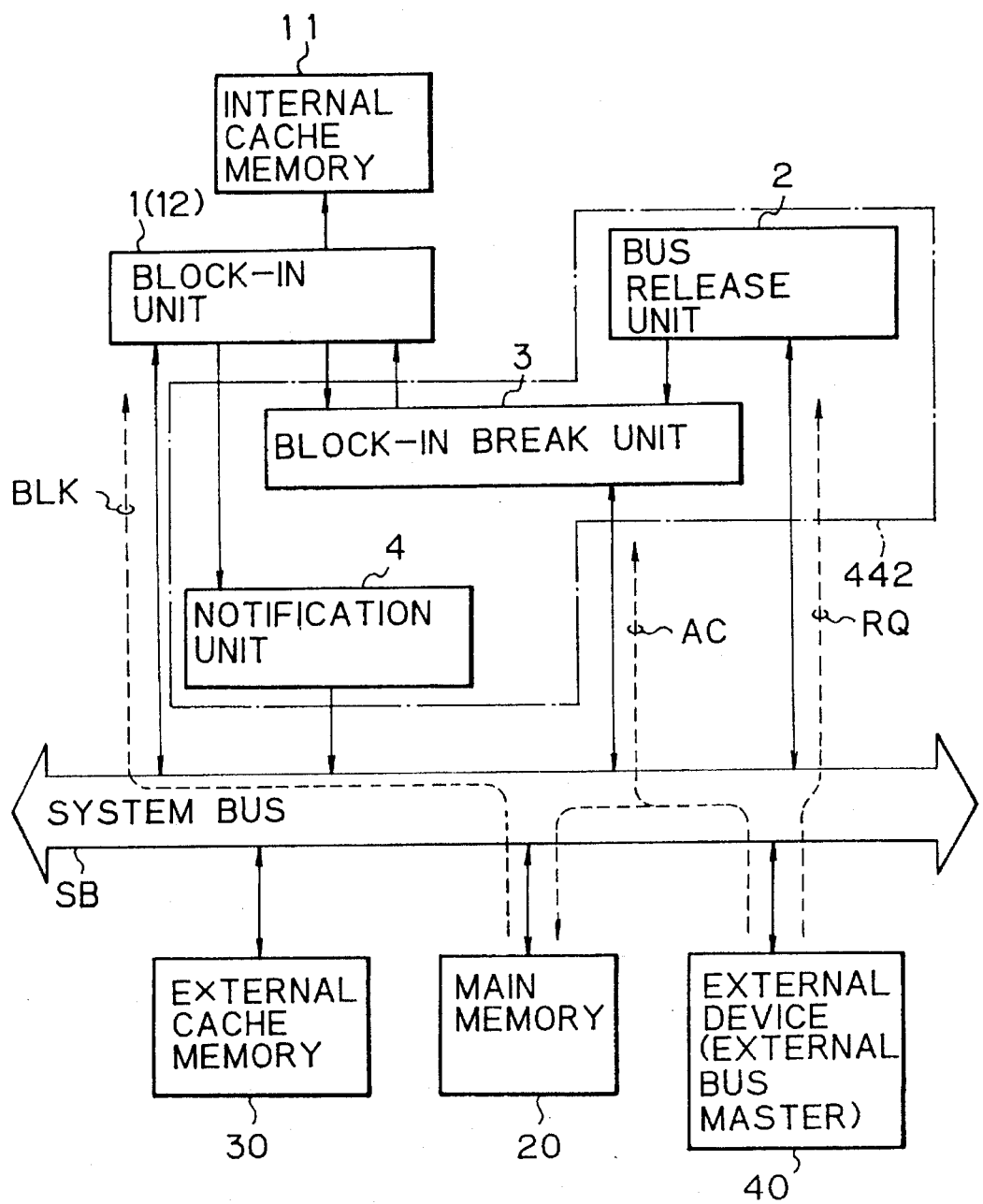
FIG. 1 is a block diagram illustrating a principle of a data processing device according to the present invention.

FIG. 1 is a diagram illustrating a principle of a data processing device according to the present invention. As shown in FIG. 1, the data processing device of the present invention is connected to a main memory 20, an external cache (memory) 30, and an external device 40 through a system bus SB, and the data processing device includes an internal cache (memory) 11 for storing a part of the contents of the main memory.

Furthermore, the data processing device of the present invention comprises a block-in unit 1, a bus release unit 2, a block-in break unit 3, and a notification unit 4. The block-in unit 1 is used to fetch one block data BLK from the main memory 20, when data for an operand access or an instruction fetch for executing an instruction is not stored in the internal cache 11. The bus release unit 2 is used to release the system bus SB in accordance with a bus request signal RQ output from the external device 40. The block-in break unit 3 is used to break the fetching operation of the block-in unit 1, when the system bus SB is released during the fetching of the one block of data (one block data) and also when write data to be written, due to a write access AC by the external device 40, into the main memory 20 coincide with the fetching of one block data. The notification unit 4 is used to notify the state of the fetching operation, as to whether it is being continuously carried out or not, to the external cache 30.

In accordance with the above described configuration, the external cache 30 can discriminate whether a fetching operation (block-in operation) of one block data is executed or not by a notification signal output from the notification unit 4, that is, the external cache 30 can determine whether the block-in operation is broken or not. Consequently, when a block-in operation (e.g., a first block in operation) is broken and another block-in operation is started, the external cache 30 can correctly discriminate whether a second block-in operation, following the first block-in operation, is continued or a new block-in operation (another block-in operation) is started.

Therefore, the data processing device can control the external cache 30 so as to causes the contents of the external cache 30 to coincide with the contents of the internal cache 11 and the main memory 20, and so that operational reliability of a computer systems using the data processing device can be increased.

Below, characteristics of the configuration and detailed descriptions of the mode of operation in the present invention will be explained with reference to accompanying drawings.

Figure 2:
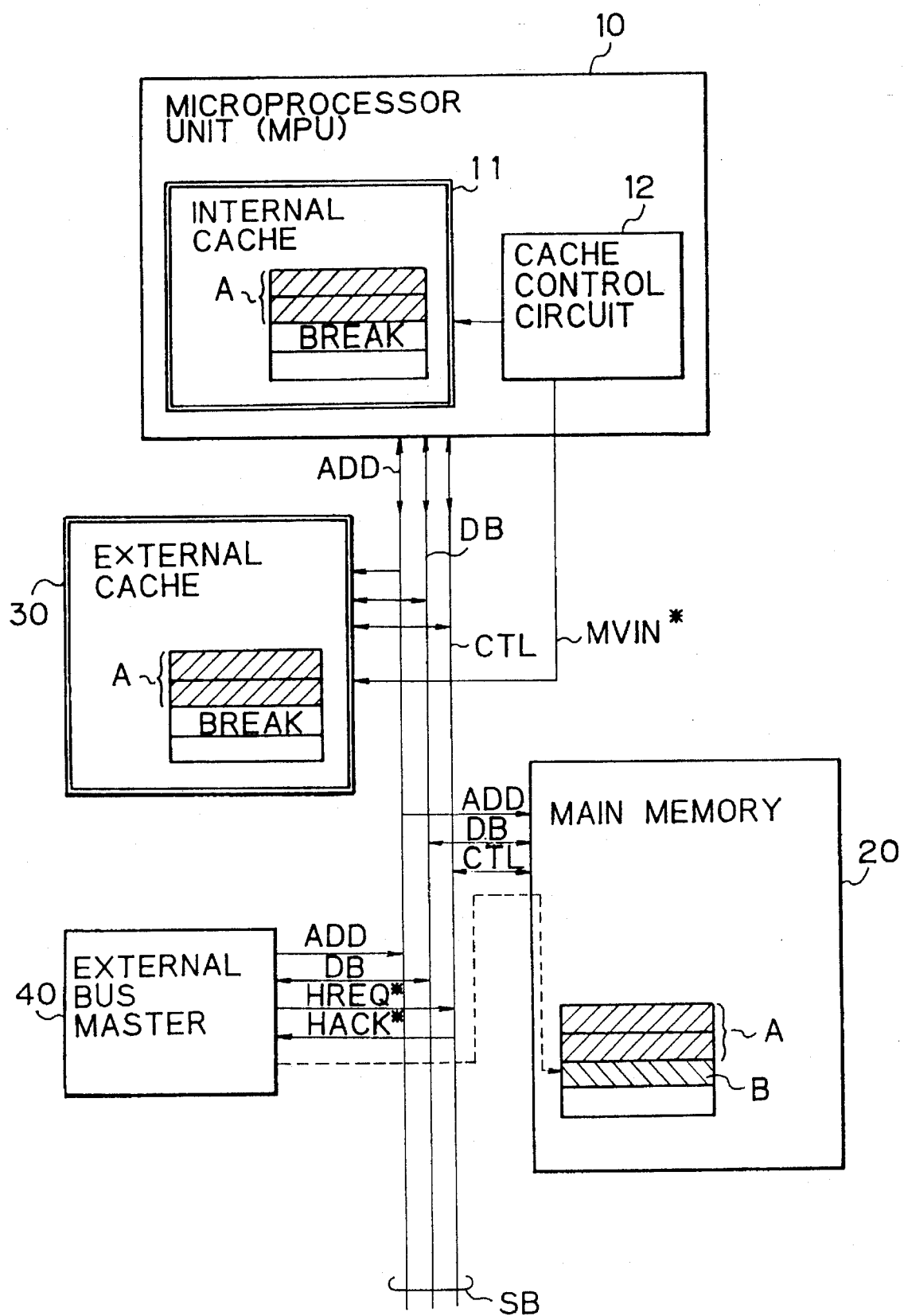
FIG. 2 is a block diagram illustrating an example of a computer system which utilizes an embodiment of the present invention.

FIG. 2 is a block diagram illustrating an example of a computer system utilizing an embodiment of the present invention. In FIG. 2, reference SB denotes a system bus, which consists of an address bus ADD for transferring address information, a data bus DB for transferring data, and a control bus CTL for transferring control signals (HREQ*, HACK*, and the like). As shown in FIG. 2, a microprocessor unit (MPU) 10, a main memory 20, an external cache 30, and an external bus master (external device) 40 are connected to one another through the system bus SB. The microprocessor (unit) 10 includes an internal cache 11 for storing (copying) a part of the contents of the main memory 20, and a cache control circuit 12 for controlling the internal cache and the external cache 30. Note, the external cache 30 includes a memory having a higher speed and larger scale capacity than the internal cache 11.

The microprocessor 10 (mainly, the cache control circuit 12) implements the following control functions: ① a function for fetching data (block-in operation) of a plurality of words as a block unit transferred from the main memory 20 through the system bus SB, when the data for an instruction fetch or an operand access are not stored in the internal cache 11 (miss-hit); ② a function for releasing (HACK*) the system bus in accordance with a bus request signal (HREQ*) output by the external bus master 40; ③ a function for breaking the block-in operation of the function ①, when the system bus SB is released during the block-in operation, and also when write data to be written due to a write access (corresponding to a signal line which is indicated by a broken line in FIG. 2) by the external bus master 40, into the main memory 20 coincide with the data of the block-in operation; and ④ a function for notifying the state of the fetching operation as to whether it is being continuously carried out or not, to the external cache 30.

In this embodiment, when a block transfer operation is carried out by the microprocessor 10 through the system bus SB, the block data transferred through the system bus SB is fetched by the external cache 30 such that the external cache 30 stores the block data on the system bus SB, and so that the contents of the external cache 30 coincide with the contents of the internal cache 11.

Note, in FIG. 2, portions A illustrated by hatching in the internal cache 11, the external cache 30 and the main memory 20, indicate the same information (data), specifically, the same information is written into the internal cache 11, the external cache 30 and the main memory 20. Namely, the portions A of the internal cache 11 are transferred from the main memory 20 through the system bus SB, and the portions A of the external cache 30 are fetched by a store operation from the bus such that the data corresponding to the portions A transferred to the internal cache 11 on the system bus SB are stored by the external cache 30 and essentially fetched into the external cache 30.

Therefore, the data corresponding to the portions A are stored in the main memory 20, the external cache 30 and the internal cache 11 while maintaining coherency thereof. In FIG. 2, a portion B, illustrated by hatching in the main memory 20, indicates data written into the main memory 20 in accordance with an access of the external bus master 40. In this case, that is, when the system bus SB is released during the block-in operation, and also when write data to be written due to the write access (indicated by a broken line in FIG. 2) by the external bus master 40 into the main memory 20 coincide with the data of the block-in operation or the fetching of one block data (BLK), the block-in operation is broken as described above, and thus writing operations to the corresponding memory areas of the internal cache 11 and the external cache 30 are stopped. Therefore, when the block-in operation of the microprocessor 10 is broken, that is, when the system bus SB is released during the fetching of the one block data and also when data written, due to a write access by the external device, into the main memory coincide with the fetching of one block data, the external cache 30 stops the subsequent steal operations in accordance with a notification signal MVIN* output from the cache control circuit 12.

In the above descriptions, when the write access by the external bus master 40 into the main memory 20 is completed, the required data (corresponding to the data of the portions A and B) may not be fetched until a new block-in operation is executed. Namely, the internal cache 11 and the external cache 30 may only stop (or invalidate) the block-in operation of the data corresponding to the portions A and B. After this, when data (corresponding to the portions A and B) for an operand access or an instruction fetch for executing an instruction is not stored in the internal cache 11, the data corresponding to the portions A and B are transferred from the main memory 20 to the internal cache 11 through the system bus SB. Note, the external cache 30 also steals the data (portions A and B) transferred to the internal cache 11 on the system bus SB. In this case, the data corresponding to the portion B are already rewritten by the external bus master 40, and the fetched data of the portions A and B by the internal cache 11 and the external cache 30 correctly coincides with the data stored in the main memory.

Figure 3B:
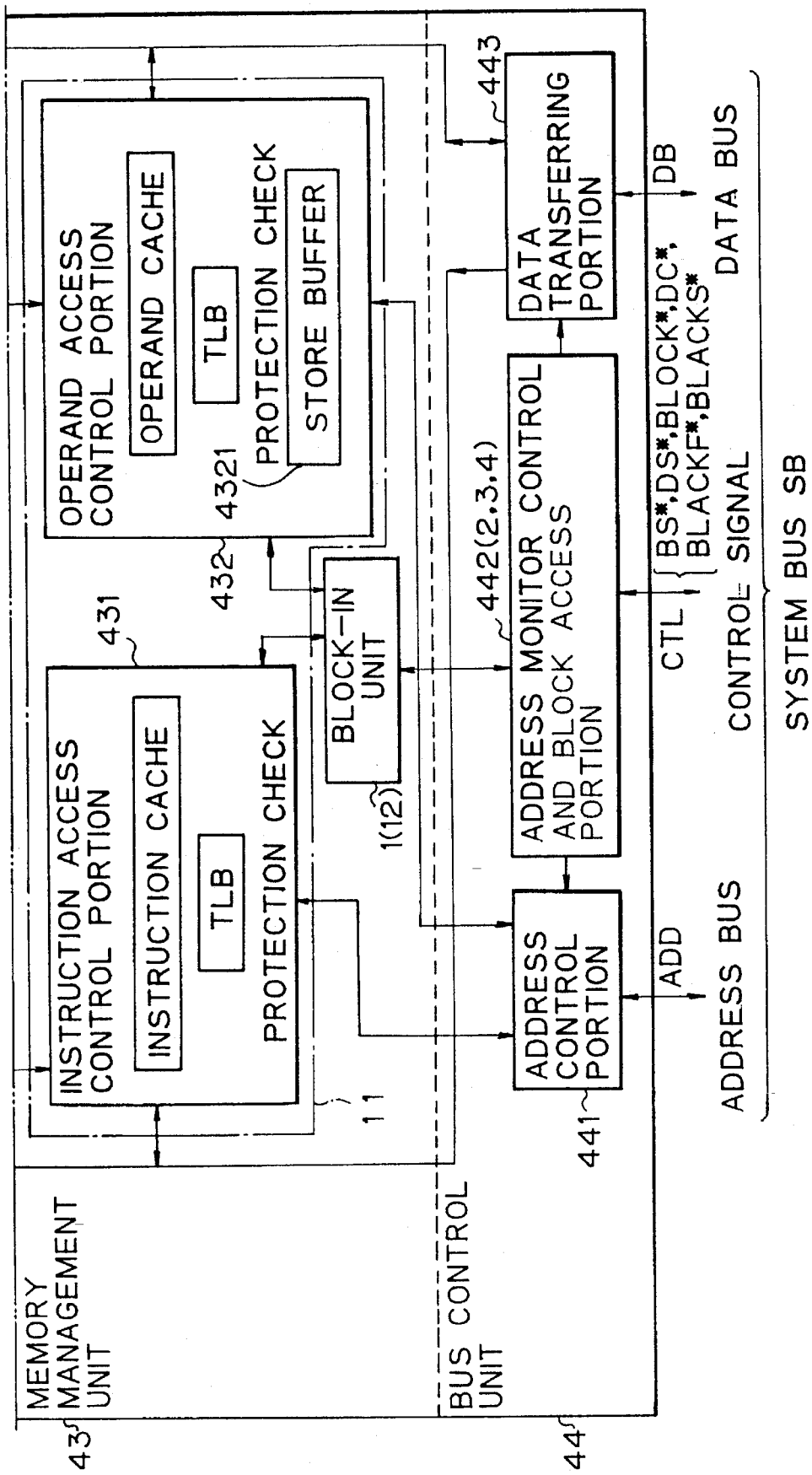
FIG. 3, consisting of FIGS. 3A and 3B, is a block diagram illustrating an example of an entire data processing device according to the present invention.

FIG. 3 is a block diagram illustrating an example of the whole data processing device according to the present invention. As shown in FIG. 3, a data processing device (microprocessing unit MPU) 10, which is a monolithic microprocessor formed in a single semiconductor body, comprises an instruction control unit 41, an instruction execution unit 42, a memory management unit 43, and a bus control unit 44.

The instruction control unit 41, which is used to control fetching, decoding, and executing instructions, comprises an instruction buffer 411, an instruction decoder 412, a pipeline control portion 413, and a microprogram (ROM) 414. The instruction buffer 411, which is an instruction queue, is used to efficiently process a variable length instruction. A prefetching operation for instructions is continuously carried out until the instruction buffer (instruction queue) 411 has no vacant buffer area. Note, this instruction prefetching operation is independently carried out without executing the instructions. Further, when a required instruction is stored in the instruction buffer 411, an access of an external memory (main memory) 20 is not carried out. In the instruction decoder 412, an instruction format, an instruction type, and an addressing mode are analyzed, and information for controlling pipeline processing, calculating an operand address, and starting a microprogram is output therefrom. In the pipeline control portion 413, an instruction is, for example, divided into five independent stages (five-stage pipeline processing) in one machine cycle, and is continuously executed. The microprogram 414, which is constituted by a read only memory (ROM), outputs detailed control information to an arithmetic portion 423 which will be described below.

The instruction execution unit 42, which is used to calculate an operand address and carry out an operand operation, comprises an address generation portion 421, a register file 422, and the arithmetic portion 423. In the address generation portion 421, an address calculation operation is carried out in accordance with the addressing mode, and the generated address is transferred to the memory management unit 43. The arithmetic portion 423, in which basic operations are carried out, has exclusive circuits for bit field manipulation instructions, multiply-divide calculation instructions, and decimal operation advancing instructions, and whereby operand processings for these instructions are efficiently carried out. The register file 422 includes general purpose registers, work registers, and stack pointers.

The memory management unit 43 comprises the internal cache memory 11 and the block-in unit (cache control circuit 12). The internal cache memory 11 includes an instruction access control portion 431 and an operand access control portion 432. The instruction access control portion 431 includes an instruction cache memory, a TLB (translation look-aside buffer), and a memory protection function (memory check). Similarly, the operand access control portion 432 includes an operand cache memory, a TLB, a memory protection function, and a store buffer 4321. The instruction access control portion 431 and the operand access control portion 432 can operate independently in accordance with control signals output from the instruction execution unit 42. Note, the TLBs need not be included in the internal cache memory 11, and the store buffer 4321 corresponds to a register in FIG. 5. Further, the process of writing instruction execution data is carried out by using a store-through method. When a system bus SB is used, the address and the data are stored in a store buffer 4321 until the data can be output. In the case that an area indicated by a write address is stated in the instruction cache, an entry corresponding to the area in the instruction cache is invalidated at the timing of writing to the main memory 20.

Figure 6:
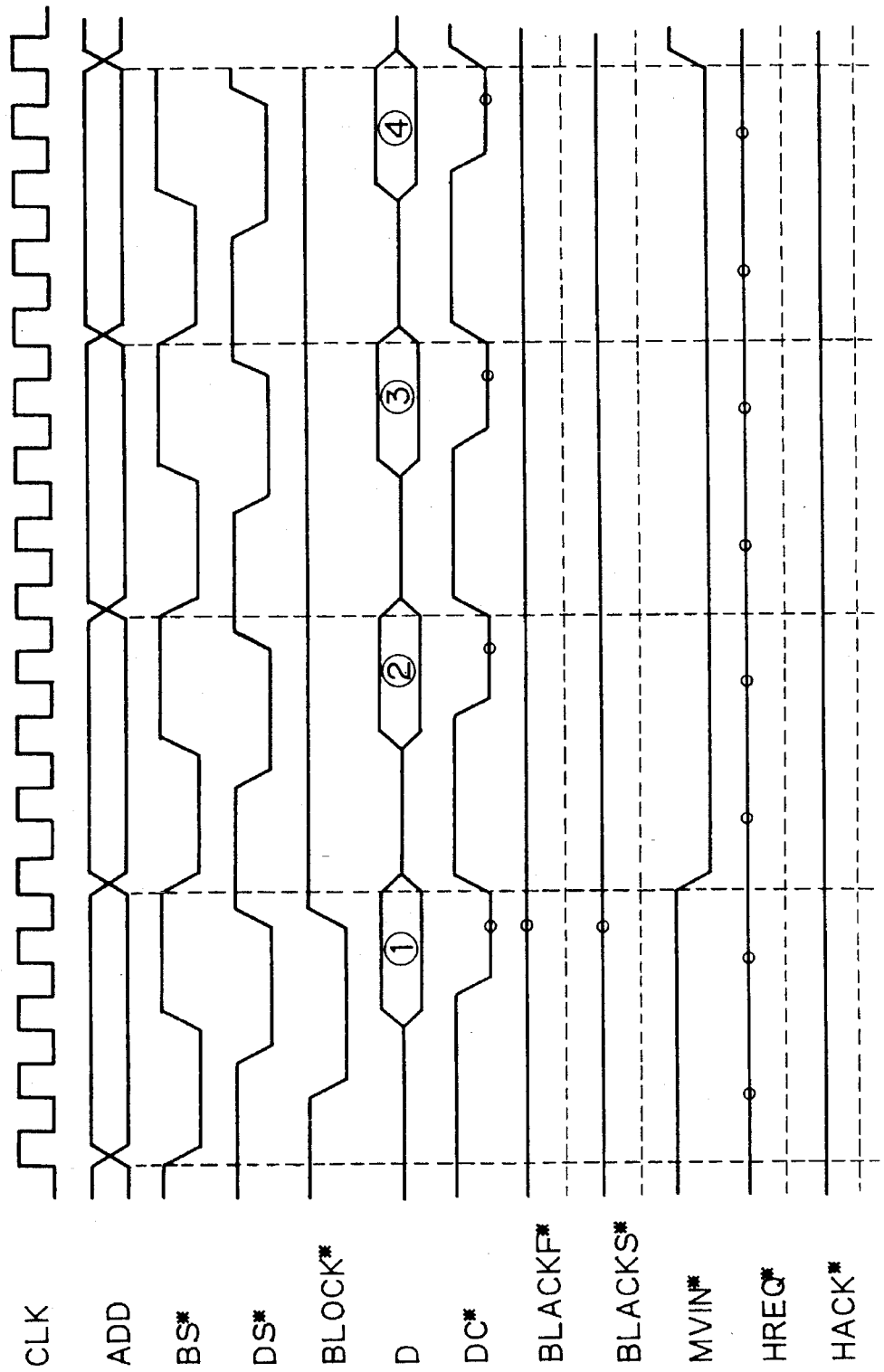
FIG. 6 is a timing chart indicating an example of the operation of a data processing device according to the present invention.
Figure 7:
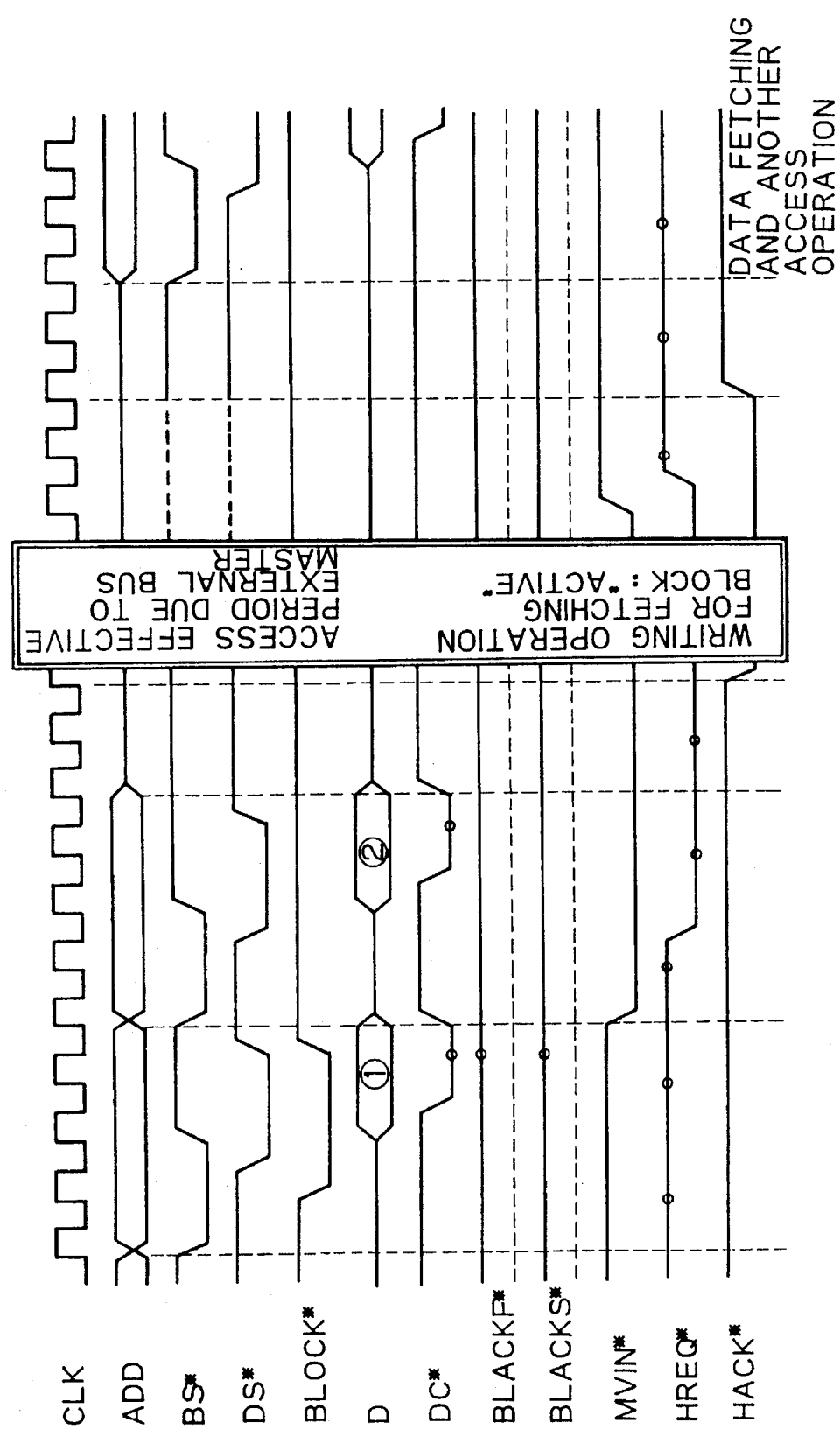
FIG. 7 is a timing chart indicating another example of the operation of a data processing device according to the present invention.

The bus control unit 44, which transfers data among an external I/O, the main memory 20, the external cache 30, the external device 40, and the microprocessing unit 10 through the system bus SB, comprises an address control portion 441, an address monitor control and block access portion 442, and a data transferring portion 443. The bus control unit 44 has a block access function for transferring one block data (for example, 16 bytes of data) to the cache memory at high speed, and an address monitoring function for making the contents of the internal cache 11 and the main memory 20 coincide by monitoring a write address on the system bus SB. Note, the bus release unit 2, the block-in unit 3 and the notification unit 4 shown in FIG. 1 are provided in the address monitor control and block access portion 442 of the bus control unit 44. Furthermore, control signals BS*, DS*, BLOCK*, DC*, BLACKF*, BLACKS*, which are indicated also in FIGS. 6 and 7, are output from the address monitor control and block access portion 442 through time control bus CTL of the system bus SB.

The present invention is mainly concerned with the memory management unit 43 and the bus control unit 44 in the monolithic microprocessor unit MPU (data processing device 10).

Figure 4B:
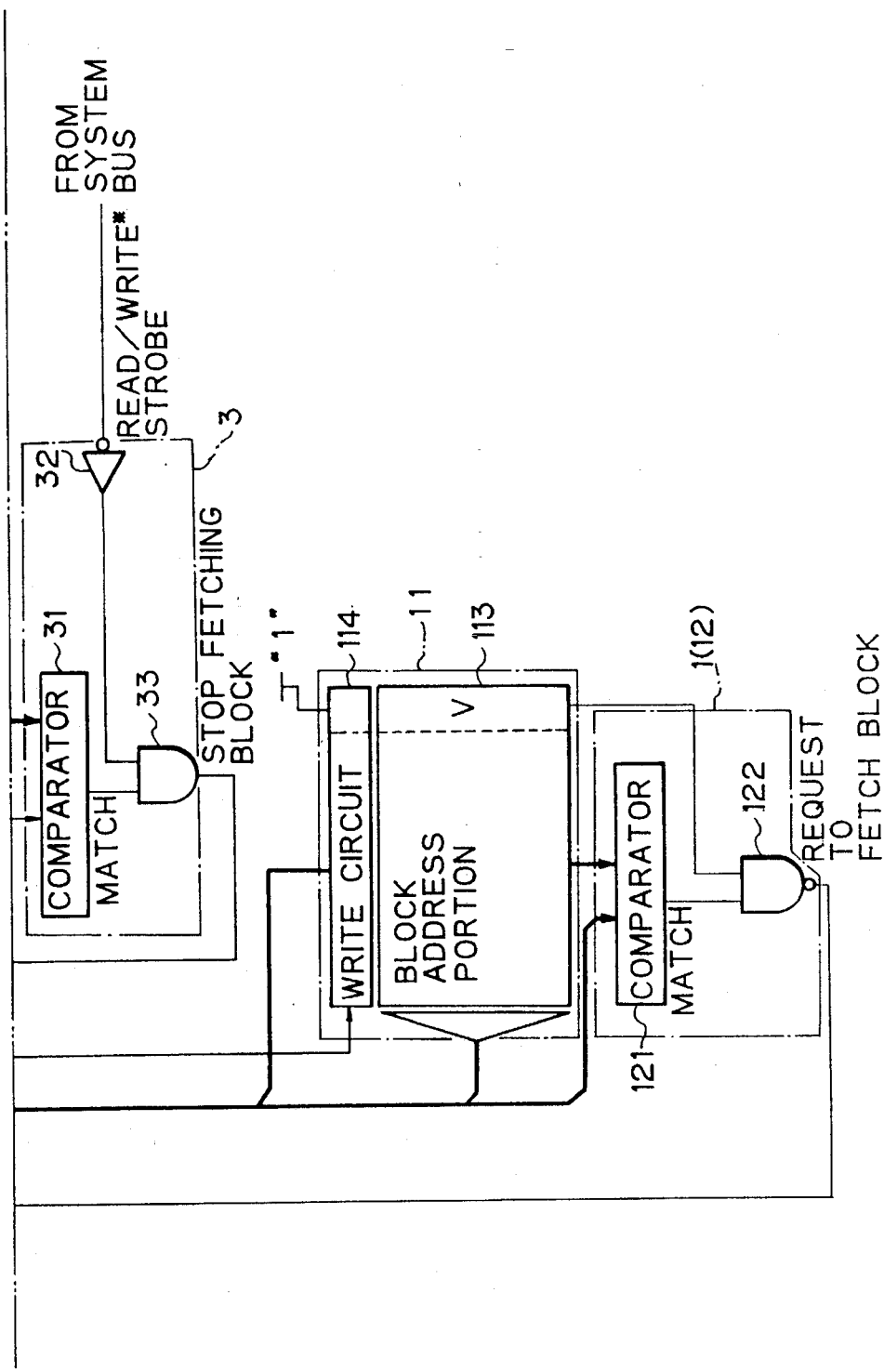
FIG. 4, consisting of FIGS. 4A and 4B, is a block circuit diagram illustrating main portions of a data processing device according to the present invention.

FIG. 4 is a block circuit diagram illustrating main portions of a data processing device according to the present invention. As shown in FIG. 4, the internal cache 11 includes a cache data portion 111, a write circuit 112 for the cache data portion 111, a block address portion 113, and a write circuit 114 for the block address portion 113. The block-in unit 1 (cache control circuit 12) includes a register 101, a sequencer 102, a comparator 121, and a NAND gate 122.

Note, a data width of the cache data portion 111 is, for example, 16 bytes suitable for one block data of four words 0 to 3 (four words of 4 bytes blocks), and the register 101 of the block-in unit 1 is divided into four word blocks $101_0$, $101_1$, $101_2$, $101_3$. The block-in break unit 3 comprises a comparator 31, an inverter 32, and an AND gate 33. As described with reference to FIG. 3, the internal cache 11, the block-in unit 1 and a register (store bufer) 4321 are included in the memory management unit 43, and the block-in break unit 3 is included in the bus control unit 44.

In this data processing device, when data for an operand access or an instruction fetch for executing an instruction exists in the internal cache 11 (which may be called a "hit"), that is, when an address of the required data is matched with an address of the data stored (existing) in the block address portion 113 by using the comparator 121 and a validity bit of the data in the block address portion 113 is valid, the NAND gate 122 outputs a low level signal to the sequencer 102, so that the data stored in the cache data portion 111 are output and used. Conversely, when data for an operand access or an instruction fetch for executing an instruction is not stored in the internal cache 11 (miss-hit), that is, when an address of the required data is not matched with an address of the data in the block address portion 113 by the comparator 121, or when a validity bit of the data in the block address portion 113 is invalid even when an address of the required data is matched with an address of the data stored in the block address portion 113, the NAND gate 122 outputs a high level signal (signal of request to fetch block) to the sequencer 102, so that one block data BLK is fetched from the main memory 20 into the cache data portion 111 (block-in operation). Namely, the sequencer 102, in order outputs latch enable signals LE0, LE1, LE2, LE3 of a high level (enable state) to the corresponding word blocks $101_0$, $101_1$, $101_2$, $101_3$, and then the one block data BLK is latched into the register 101 (four word blocks $101_0$, $101_1$, $101_2$, $101_3$) and written into the cache portion 111 by the write circuit 112. Note, the order of latching of one block data BLK into the register 101 is not only carried out from a first word block $101_0$, but also from a second word block $101_1$, a third word block $101_2$, or a fourth word block $101_3$ by an access address. Concretely, the one block data BLK is not only latched in the order of the four word blocks $101_0 \rightarrow 101_1 \rightarrow 101_2 \rightarrow 101_3$, but also $101_1 \rightarrow 101_2 \rightarrow 101_3 \rightarrow 101_0$, $101_2 \rightarrow 101_3 \rightarrow 101_0 \rightarrow 101_1$, or $101_3 \rightarrow 101_0 \rightarrow 101_1 \rightarrow 101_2$. Further, a write enable signal is only output from the sequencer 102 to the write circuit 112, when all of the four word blocks $101_0$, $101_1$, $101_2$, $101_3$ are filled by the one block data BLK.

In the case of carrying out the block-in operation, when a bus request signal RQ is output from the external device 40, the address monitor control and block access portion 442 of the bus control unit 44 (which is shown in FIG. 3) releases the system bus SB for changing the right to access a bus master to the external device 40.

Furthermore, in this state, when data written due to a write access AC by the external device 40 into the main memory 20 coincides with the fetching of one block data, that is, when the system bus SB is released during the fetching of the one block data, and also when data written due to the write access AC bey the external device 40 into the main memory 20 coincides with the fetching of one block data, the sequencer 102 outputs a notification signal MVIN* to the external cache 30. Namely, the address of the one block data: (block address) stored in the register 4321 is supplied to the comparator 31 and compared with an address of the data written due to the write access AC of the external device 40 by the comparator 31. When these addresses are matched by the comparator 31, and also when a read/write* strobe signal supplied to the inverter 32 is at a low level (write mode), the AND gate 33 outputs a high level signal (stop fetching block signal) to the sequencer 102, so that the sequencer 102, in order, outputs latch enable signals LE0, LE1, LE2, LE3 of a low level (disable state) to the corresponding word blocks $101_0$, $101_1$, $101_2$, $101_3$. Therefore, for example, when the stop fetching block signal is output the timing between fetching the word 1 and the word 2, only two words 0 and 1 are latched into the word blocks $101_0$, $101_1$, and the following two words 2 and 3 are not latched into the word blocks $101_2$, $101_3$.

In the above descriptions, when the write access by the external device (bus master) 40 is completed, the fetched data in the register 101 (word blocks $101_0$, $101_1$, $101_2$, $101_3$) are invalidated and the required data (including the fetched data) are newly fetched from the first address of the data, and the same processes carried out in the internal cache 11 are also carried out in the external cache 30. For example, with reference to FIG. 2, if the stop fetching block signal is output when the timing of fetching is between the word blocks $101_2$ and $101_3$, the portions A correspond to the word 0 and 1 (word blocks $101_0$, $101_1$) and the portion B corresponds to the word 2, or words 2 and 3 (word block $101_2$, or word blocks $101_2$, $101_3$). In the above data processing device, when the same data (corresponding to the portions A and B) for an operand access or an instruction fetch for executing an instruction (new instruction) are not stored in the internal cache 11, the data (portions A and B) are transferred again from the main memory 20 to the internal cache 11 through the system bus SB, and the external cache 30 steals the data transferred to the internal cache 11 on the system bus SB. In this case, the data corresponding to the portion B are already rewritten by the external device 40, and the fetched data of the portions A and B by the internal cache 11 and the external cache 30 correctly coincide with the data stored in the main memory.

Figure 5:
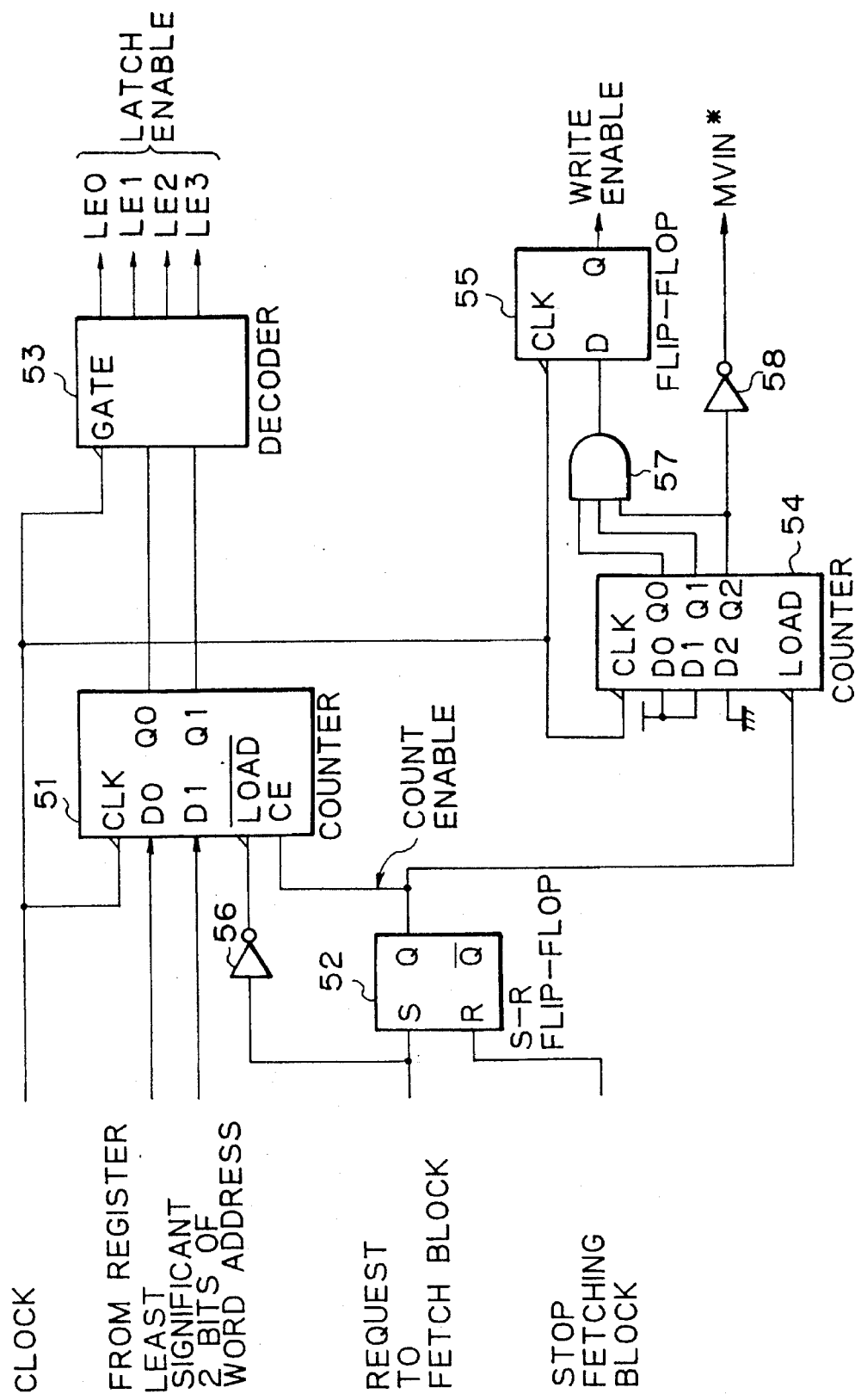
FIG. 5 is a block circuit diagram illustrating a sequencer shown in FIG. 4.

FIG. 5 is a block circuit diagram illustrating a sequencer shown in FIG. 4. As shown in FIG. 5, the sequencer 102 comprises counters 51, 53, a decoder 53, flip-flops 52, 55, inverters 56, 58, and an AND gate 57. The clock signal (CLOCK) is supplied to clock terminals CLK of the counters 51, 54, the flip-flop 55, and a gate terminal GATE of the decoder 53. The least significant 2 bits of the word address are supplied to terminals D0 and D1 of the counter 51, and a request signal to fetch a block output from the NAND gate 122 (shown in FIG. 4) is supplied to a load terminal LOAD* (i.e., $\overline{\text{LOAD}}$ in FIG. 4) of the counter 51 through the inverter 56 and a set terminal S of the S-R flip-flop 52. The stop fetching block signal is supplied to a reset terminal R of the flip-flop 52 and an output signal Q of the flip-flop 52 is supplied to a count enable terminal CE of the counter 51 and a load terminal LOAD of the counter 54.

Output signals Q0, Q1 of the counter 51 are supplied to the decoder 53, and the decoder 53 outputs latch enable signals LE0, LE1, LE2, LE3. Note, the counter 51 is operated when the signal of the request to fetch a block is at a high level and the count enable signal (output signal of the flip-flop 52) is at a high level. Further, the latch enable signals LE0, LE1, LE2, LE3 are sequentially output in the order of a first latch enable signal LE0, a second latch enable signal LE1, a third latch enable signal LE2, or a fourth latch enable signal LE3. Therefore, one block data BLK is latched into the register 101 including four word blocks in the order of a first word block $101_0$, a second word block $101_1$, a third word block $101_2$, or a fourth word block $101_3$.

Output signals Q0, Q1, Q2 of the counter 54 are supplied to the AND gate 57, and the output signal Q2 of the counter 54 is inverted by the inverter 58 and designated as a notification signal MVIN*. Note, a high potential (high level) is applied to terminals D0, D1 of the counter 54, and a ground potential (low level) is applied to a terminal D2 of the counter 54. An output signal of the AND gate 57 is supplied to a terminal D of the flip-flop 55, and an output signal Q of the flip-flop 55 is determined as a write enable signal. Further, the write enable signal is only changed to a high level (enable, state), when all of the four latch enable signals LE0, LE1, LE2, LE3 are output, or when four words (one block data) are latched into the register 101 (four word blocks $101_0$, $101_1$, $101_2$, $101_3$). Furthermore, the notification signal MVIN* is changed to a low level after fetching a second word data (word 1).

In the above descriptions, when the stop fetching block signal output from the AND gate 33 (shown in FIG. 3) is changed to a high level, the count enable signal (output signal of the flip-flop 52) is at a low level, so that the latch enable signals LE0, LE1, LE2, LE3 are changed to low levels (disable state). In this case, the notification signal MVIN* is returned to a starting state, where the notification signal MVIN* is changed to a low level after fetching a second word data.

FIGS. 6 and 7 are timing charts indicating examples of an operation in the microprocessor unit 10.

In FIGS. 6 and 7, reference CLK denotes a system clock, ADD denotes address information, BS* denotes a bus strobe signal, DS* denotes a data strobe signal, BLOCK* denotes a signal for indicating the carrying out of a block transfer externally, D denotes data, DC* denotes a data clock, BLACKF* and BLACKS* denote signals indicating the state of transferring speed (high speed or low speed), MVIN* denotes a signal for instructing a fetching operation of the block data, HREQ* denotes a control signal for instructing a bus request output from the external bus master 40, and HACK* denotes a control signal for instructing an acknowledgement of the bus request. Note, the above control signals are active low types, and thus, when the control signals change to low levels "L", various functions are activated. Further, the block transfer signal BLOCK* is used when data accessed by the microprocessor MPU (10) is not required to be fetched into the cache memory, for example, when microprocessor MPU accesses data for a bit set instruction.

FIG. 6 is a timing chart indicating an example of an operation where the microprocessor 10 is carrying out a block-in operation, and the external device (external bus master 40) does not output a bus request HREQ*, that is, the control signal HREQ* is maintained at a high level "H". In this example, it is indicated that one block data corresponding to four words of ① to ④ is fetched into the internal cache 11 of the microprocessor 10. Therefore, in this case, data which is the same as the one block data fetched into the internal cache 11, is input into the external cache 30 by a steal operation thereof, and thus the contents of the external cache 30 coincide with the contents of the internal cache 11.

On the other hand, FIG. 7 is a timing chart indicating an example of an operation where the microprocessor 10 is carrying out a block-in operation, the external bus master 40 outputs a bus request signal HREQ*, that is, the bus request signal HREQ* is changed to a low level "L", and also a write access to the main memory 20 by the external device 40 overlaps the block-in operation. In this example, it is indicated that data (corresponding to two words ① and ②) are fetched into the internal cache 11, and a fetching operation of the following data input into the internal cache 11 are broken. Therefore, in this case, the external cache 30 steals the data corresponding to two words, and the external cache 30 stops the following steal operation. Namely, the external cache 30 makes the contents thereof (data corresponding to two words) coincide with that of the internal cache 11 without causing an error in operation.

As described above, the external cache 30 can confirm whether a block-in operation of the microprocessor 10 is broken or not by receiving a control signal from the microprocessor 10, and thus the contents of the external cache can correctly coincide with the contents of the internal cache 11 (and the main memory 20) by carrying out a steal (i.e. store) operation. Therefore, the operational reliability of the total system is increased.

Many widely differing embodiments of the present invention may be constructed without departing from the spirit and scope of the present invention, and it should be understood that the present invention is not limited to the specific embodiments described in this specification, except as defined in the appended claims.

We claim:

1. A data processing device connected through a system bus to a main memory having contents, an external cache memory storing a selected part of the contents of said main memory and an external device for accessing the system bus, said data processing device including an internal cache memory for storing another selected part of the contents of said main memory, said data processing device comprising:

block-in means for fetching one block data from said main memory containing needed data when the needed data is not stored in said internal cache memory;

bus release means for releasing said system bus in accordance with a bus request signal output from said external device;

block-in break means for stopping the fetching by said block-in means, when said system bus is released during the fetching of said one block data and when write data to be written, due to a write access by said external device, into said main memory coincides with said one block data being fetched; and notification means for determining whether the fetching is being continuously carried out and generating a notification signal indicative of the fetching by the block-in means being stopped by the block-in break means, and said external cache memory stopping subsequent store operations in response to receipt of the notification signal.

2. A data processing device as claimed in claim 1, wherein said external cache memory stores the one block data transferred to said internal cache memory through said system bus.

3. A data processing device as claimed in claim 1, wherein said bus release means, said block-in break means and said notification means comprise an address monitor control and block access portion of bus control means.

4. A data processing device as claimed in claim 1, wherein said external device is a direct memory access controller.

5. A data processing device as claimed in claim 1, wherein said data are written into said internal cache memory by using a block transfer process.

6. A data processing device as claimed in claim 1, wherein said block-in means comprises a register and a sequencer connected to said register.

7. A data processing device as claimed in claim 6, wherein said register is divided into four word blocks.

8. A data processing device as claimed in claim 6, wherein said sequencer includes counters, a decoder connected to one of said counters, flip-flops connected to said counters, and logic gates connected between said counters and said flip-flops.

9. A data processing device as claimed in claim 1, wherein said block-in break means comprises a comparator and logic gates connected to said comparator.

10. A data processing device as claimed in claim 1, wherein said internal cache memory comprises a cache data portion, a write circuit for said cache data portion, a block address portion, and a write circuit for said block address portion.

11. A data processing device as claimed in claim 1, wherein said block-in means and said internal cache memory comprise memory management means.

12. A monolithic microprocessor formed in a single semiconductor body, connected to a main memory having contents, an external cache memory and an external device through a system bus, said monolithic microprocessor comprising:

instruction control means for controlling fetching, decoding, and executing of instructions;

instruction execution means for calculating a operand address and executing an operand operation;

memory management means including;

an internal cache memory for storing a part of the contents of said main memory; and block-in means for fetching one block data containing needed data from said main memory when the needed data is not stored in said internal cache memory; and bus control means for transferring data among an external device, said external cache memory, said main memory and said monolithic microprocessor through said system bus, said bus control means including:

bus release means for releasing said system bus in accordance with a bus request signal output from said external device;

block-in break means for stopping the fetching by said block-in means when said system bus is released during the fetching of said one block data and when write data to be written, due to a write access by said external device, into said main memory coincides with said one block data being fetched; and notification means for notifying said external cache memory whether the fetching is being continuously carried out.

13. A monolithic microprocessor as claimed in claim 12, wherein said external cache memory stores the one block data transferred to said internal cache memory through said system bus.

14. A monolithic microprocessor as claimed in claim 13, wherein said external cache memory stops subsequent store operations in accordance with a notification signal output from said notification means.

15. A monolithic microprocessor as claimed in claim 12, wherein said external device comprises a direct memory access controller.

16. A monolithic microprocessor as claimed in claim 12, wherein said one block data are written into said internal cache memory by using a block transfer process.

17. A monolithic microprocessor as claimed in claim 12, wherein said block-in means comprises a register and a sequencer connected to said register.

18. A monolithic microprocessor as claimed in claim 17, wherein said register is divided into four word blocks.

19. A monolithic microprocessor, as claimed in claim 17, wherein said sequencer includes counters, a decoder connected to one of said counters, flip-flops connected to said counter, and logic gates connected between said counter and said flip-flops.

20. A monolithic microprocessor as claimed in claim 12, wherein said block-in break means comprises a comparator and logic gates connected to said comparator.

21. A monolithic microprocessor as claimed in claim 12, wherein said internal cache memory comprises a cache data portion, a write circuit for said cache data portion, a block address portion, and a write circuit for said block address portion.

22. A data processing device comprising:

a main memory;

an external cache memory;

an external device;

a system bus; and a microprocessing unit including an internal cache memory for storing a part of a contents of said main memory, and connected to said main memory, said external cache memory and said external device through said system bus, said microprocessing unit comprising:

block-in means for fetching one block data from said main memory containing needed data when the needed data is not stored in said internal cache memory;

bus release means for releasing said system bus in accordance with a bus request signal output from said external device;

block-in break means for stopping the fetching by said block-in means, when said system bus is released during the fetching of said one block data, and when write data to be written, due to a write access by said external device, into said main memory coincides with said one block data being fetched; and notification means for notifying said external cache means whether the fetching is being continuously carried out.

23. A data processing system as claimed in claim 22, wherein said external cache memory stores the one block data transferred to said internal cache memory through said system bus.

24. A data processing device as claimed in claim 23, wherein said external cache memory stops subsequent store operations in accordance with a notification signal output from said notification means.

25. A data processing device as claimed in claim 22, wherein said external device comprises a direct memory access controller.

26. A data processing device as claimed in claim 22, wherein said one block data are written into said internal cache memory by a block transfer process.

27. A data processing device as claimed in claim 22, wherein said block-in means and said internal cache memory comprise a memory management means.

28. A data processing device as claimed in claim 22, wherein said bus release means, said block-in break means and said notification means comprise an address monitor control and block access portion of bus control means.

29. A cache control method of avoiding inconsistency among an internal cache memory provided in a microprocessor unit, an external cache memory and a main memory during writing by an external device, where said external cache memory and said main memory are connected to said internal cache memory through a system bus and said external cache memory stores data transferred thereto by said system bus, said cache control method comprising the steps of:

fetching one block data from said main memory containing needed data when the needed data is not stored in said internal cache memory;

releasing said system bus if not released in accordance with a bus request signal output from said external device;

stopping the fetching of said one block data when said system bus is released during the fetching of said one block data, and when write data to be written due to a write access by said external device into said main memory coincides with said one block data being fetched;

notifying said external cache memory whether the fetching is being continuously carried; and stopping a store operation by said external cache.

30. A cache control method as claimed in claim 29, wherein said one block data are written into said internal cache memory by a block transfer process.

* * * * *

UNITED STATES PATENT AND TRADEMARK OFFICE
CERTIFICATE OF CORRECTION

PATENT NO. : 5,455,925
DATED : Oct. 3, 1995
INVENTOR(S) : KITAHARA et al.

It is certified that error appears in the above-indentified patent and that said Letters Patent is hereby corrected as shown below:

Col. 2,    line 12, after "unit" delete ",";
           line 18, after "data" insert --;--;
           line 53, after "memory" delete ",";
           line 59, after "unit" delete ",";
           line 61, after "unit" delete ",".

Col. 4,    line 55, change "systems" to --system--.

Col. 5,    line 14, after "unit" insert --,--;
           line 36, after "portions A" insert --,--;
           line 38, change "(data)," to --(data);--;
           line 55, after "operation" delete ",";
           line 56, after "written" insert --,--;
           line 57, after "master 40" insert --,--.

Col. 7,    line 4, after "block-in unit" insert --1--;
           line 43, change "through time" to --through the--.

Col. 8,    line 51, change "bey" to --by--;
           line 55, after "data" delete ";";
           line 63, change "102, in order, outputs" to --102 outputs, in order,--.

Col. 10,   line 1, change "(enable,, state)" to --(enable state)--;
           line 31, change "to-low" to --to low--;
           line 65, change "in-operation" to --in operation--.

UNITED STATES PATENT AND TRADEMARK OFFICE
CERTIFICATE OF CORRECTION

PATENT NO.   :   5,455,925
DATED        :   Oct. 3, 1995
INVENTOR(S)  :   KITAHARA et al.

It is certified that error appears in the above-indentified patent and that said Letters Patent is hereby corrected as shown below:

Col. 12, line 17, change "including;" to --including:--.

Signed and Sealed this

Twenty-third Day of January, 1996

Attest:

BRUCE LEHMAN

*Attesting Officer*    *Commissioner of Patents and Trademarks*